June 19, 1928.

H. A. HOESCHEN

VALVE

Filed June 6, 1927

INVENTOR
Henry A. Hoeschen
BY Arthur C. Brown
ATTORNEY

June 19, 1928.

H. A. HOESCHEN

VALVE

Filed June 6, 1927

INVENTOR
Henry A. Hoeschen
BY
ATTORNEY

Patented June 19, 1928.

1,673,824

UNITED STATES PATENT OFFICE.

HENRY A. HOESCHEN, OF OMAHA, NEBRASKA, ASSIGNOR OF ONE-HALF TO J. L. BAKER, OF OMAHA, NEBRASKA.

VALVE.

Application filed June 6, 1927. Serial No. 196,740.

My invention relates to valves and more particularly to pilot valves.

My object is to enable a pilot valve to admit fluid for actuation of a primary valve by hydraulic means, to reduce the strain and vibration on the parts, and to enable the actuation of the pilot valve by a relatively small degree of force compared with the pressure on the primary valve.

My object is accomplished by providing an electrically actuated pilot valve and means for operating the primary valve which, with details of structure and function, will be particularly described with references to the accompanying drawings, wherein:

Fig. 3 is a detail fragmentary longitudinal sectional view of the magnet, armature and pilot valve actuating lever.

Fig. 4 is a detail perspective of dissociated but related parts of the pilot valve.

Fig. 5 is a cross sectional view of the pilot valve and lever and the housing containing the valve assembly.

Figure 1:
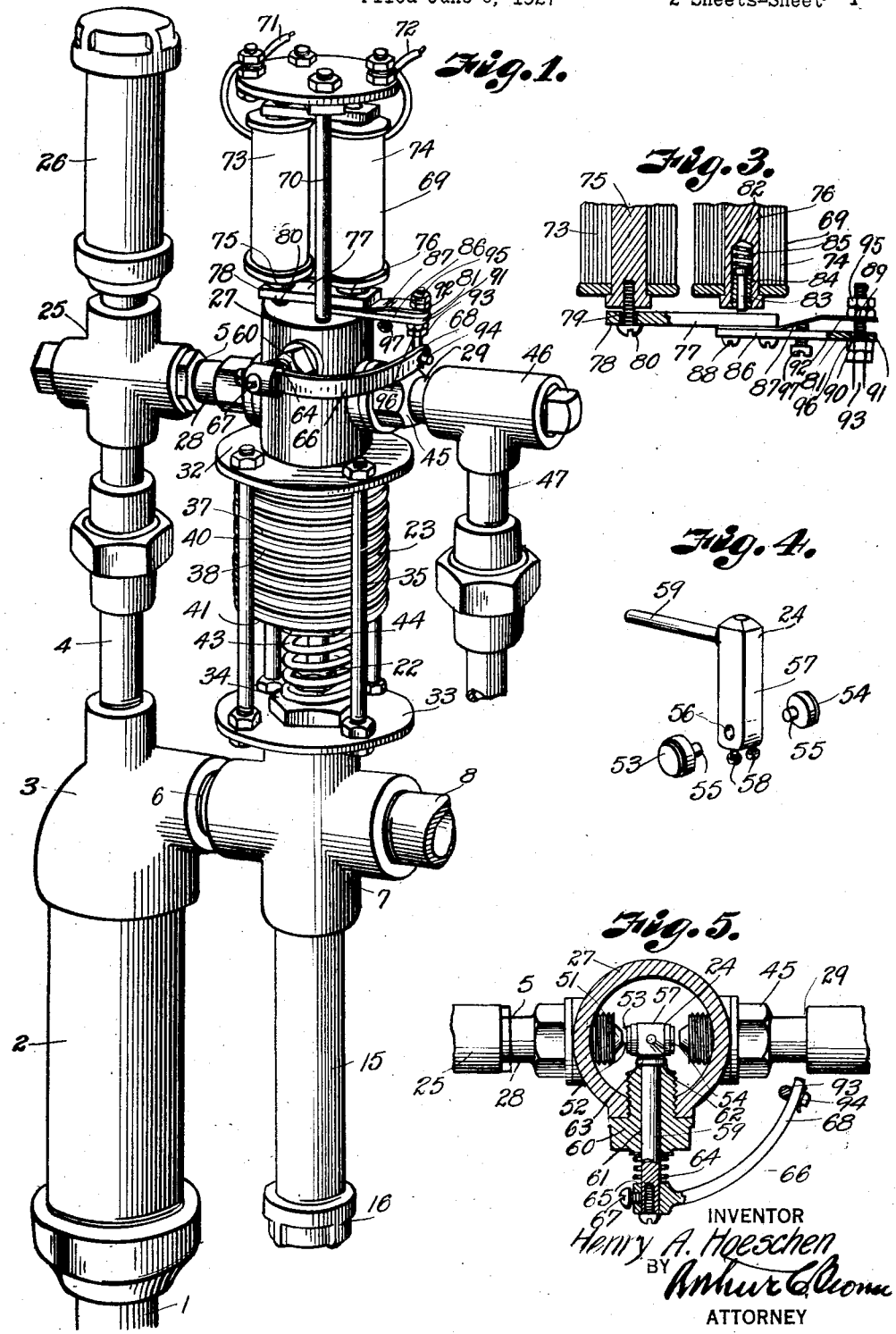
Fig. 1 is a perspective view of the pipe line and electrically actuated pilot valve control means of the pipe line valve.
Figure 2:
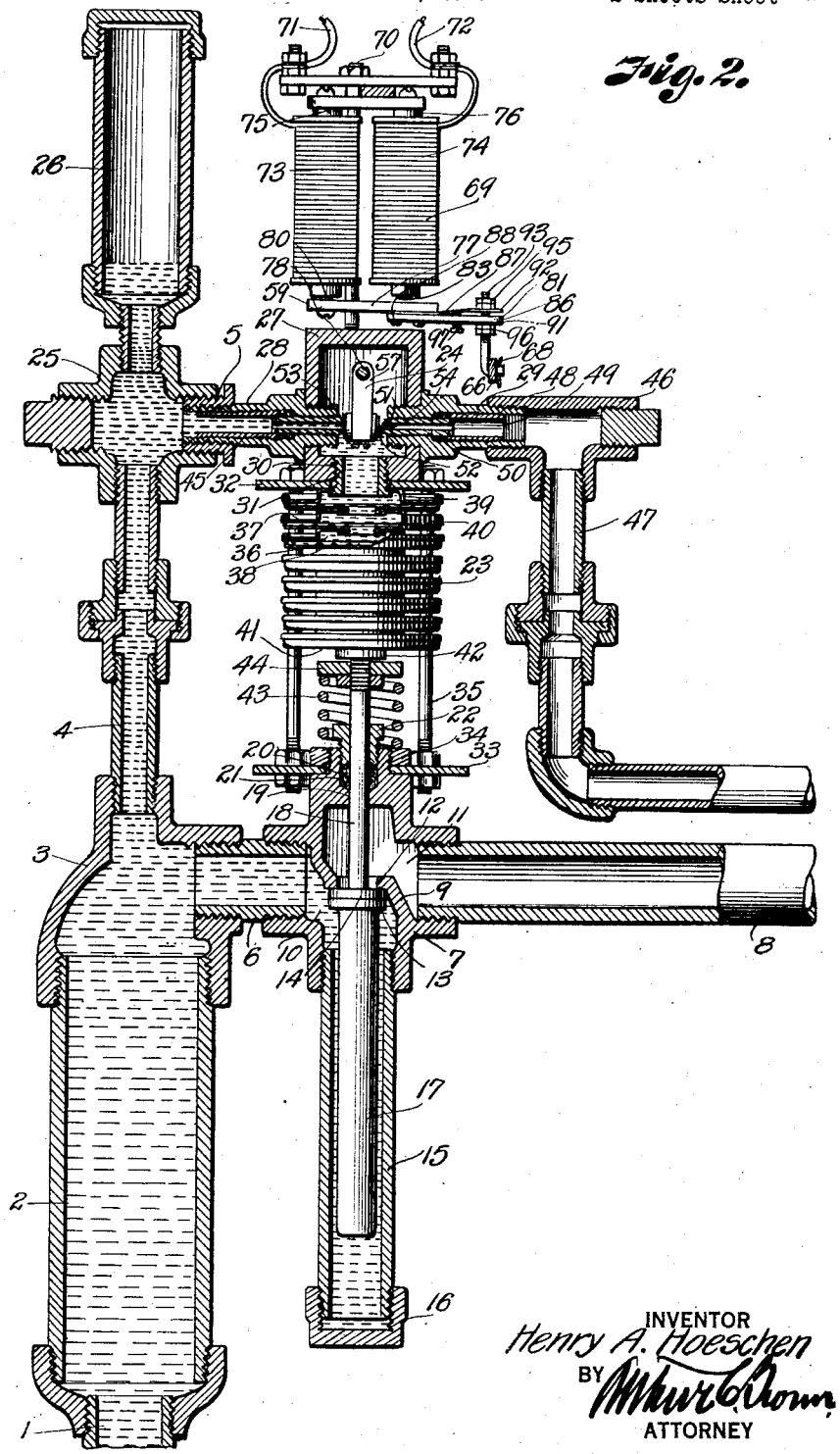
Fig. 2 is a longitudinal sectional view of the valves and adjacent elements.

Referring in detail to the drawings:

1 designates a main pipe line or conduit carrying a liquid or gas and constituting the source of a fluid under pressure, 2 is a drum or cushion chamber in the line for slowing down the velocity of the fluid for admission to a valve. 3 is a T receiving in its three openings the drum 2, the vertical member 4 of a secondary conduit system generally designated 5, and the coupling section 6 which constitutes the inlet of the main line into the main line valve housing 7. A main line outlet 8 is installed in the valve housing 7 opposite to the inlet 6 and aligned therewith.

A partition 9 in the housing 7 produces the inlet chamber 10 and the outlet chamber 11, the partition having a port 12 communicating the chambers, and a valve seat 13 on its lower face on which the valve 14 is adapted to seat to close the port 12 under the influence of the fluid pressure admitted into the valve housing through the inlet 6. A depending tubular well member 15 is provided, screw-threadedly engaged with the valve housing and communicating with the inlet chamber 10, its lower end being closed by the cap nut 16, the well being provided to receive the elongated weight 17 attached to and depending from the valve 14. The purpose of the weight is to partly counterbalance the influence of the fluid pressure and also to stabilize the movements of the valve and reduce vibration and chattering.

A valve stem 18 is secured to the valve and projects through the port 12 and through an opening 19 in the valve housing. The stem is slidable in the opening and is properly packed for preventing leakage from the housing and the pipe line by packing 20 disposed in a recess 21 and retained by a packing nut 22 screw-threadedly engaged in the housing, the stem extending through the nut.

The means for actuating the valve 14, which is the primary valve for the main conduit, includes the longitudinally expansible chamber 23 projectible against the valve stem, the chamber communicating with the secondary conduit 5 and being projectible downwardly to displace the valve by the pressure of fluid admitted through the secondary conduit into the chamber; an electrically actuated valve 24 controlling said actuation, as will be particularly described.

The secondary conduit system 5 comprises the cross fitting 25 that receives the vertical members 4, the cushion member 26 oppositely installed, to member 4 in the cross, the pilot valve casing 27, the pilot valve inlet member 28 engaged with the cross, and the casing outlet member 29, the casing 27 having communication with said extensible chamber, all of which will be more particularly described.

A lower threaded opening 30 in the pilot valve casing receives the exteriorly threaded nut 31 with which the chamber 23 is secured or integral, the casing communicating with the chamber through the nut. An annulus 32 is sleeved on the nut between the casing and the chamber 23, which in co-operation with a similar annulus 33 on the upper end of the main line valve housing 7 and retained by a nut 34, supports standards or posts 35 that guide the chamber and that also assist in supporting and stabilizing the pilot valve assembly.

The chamber 23 is of well known metallic hydrostatic bellows construction, comprising a plurality of connected centrally orificed chamber members 36, a chamber member consisting of spaced upper and lower flexible circular diaphragms 37 and 38 secured together at their outer edges, adjacent chamber members being secured together by engagement of the inner edge of a lower diaphragm with the inner edge of an upper diaphragm. Offsetting of annular portions of upper diaphragm, as at 39, and flanges on the peripheries of the lower diaphragms, as at 40, produce vertical spacings that permit access of fluid introduced under pressure into the piston-like bellows chamber 23 to all parts of the interior thereof, for uniformly influencing all parts.

A rigid imperforate bottom plate 41 of the chamber 23 is secured to a disk 42 that bears on the upper end of the valve stem 18.

Fluid admitted under pressure from the secondary conduit 5 through the pilot valve housing 27 into the chamber 23, causes the extension of the chamber, and the propulsion of the valve stem 18 to displace the valve 14 to open the port 12 in the main conduit. Upon withdrawal of the said pressure, by operation of the valve 24 to close the inlet to the pilot valve casing, an expansive coil spring 43, disposed around the stem 18 and bearing against the nut 34 on the main line valve housing, and against a nut 44 fixed on the upper portion of the stem, assists the pressure in the main conduit to restore the valve to its seat and to lift the bellows chamber to original position. The fluid that had been injected into the chamber to extend it, is incidentally expelled through the pilot valve casing and outwardly through the outlet 29.

The maximum cross section of fluid-receiving chambers in the bellows chamber is substantially greater than the effective area of influence of the main line fluid pressure on the valve 14, so that a considerable differential exists between the force of the chamber and the resistance of the valve, at the expense of speed, whereby a relatively small amount of pressure will unseat the valve, assisted by the weight 17.

The pilot valve assembly and adjacent elements of the secondary conduit system will now be described. The inlet and outlet members 28 and 29 of the system 5 that serve the casing, are similar, each comprising a nipple 45, the opposite ends of which are screw-threadedly engaged respectively with the cross fitting 25 and the T 46 of the waste line 47. Each nipple has an interiorly countersunk or recessed and threaded portion 48 adjacent its outer end and a sleeve 49 screw-threaded into this portion, its inner end being spaced from the inner end of the countersunk channel to permit introduction of packing 50 that seals the outer ends of a nozzle 51, screw-threaded into the inner end of the nipple and projecting into said recessed portion.

The inlet and outlet nozzles 51 are provided with valve seats 52 on their inner ends within the casing and projecting beyond said nipples, the valve seats being adjusted to receive the faces 53 inlet and 54 outlet of the pilot valve 24. This valve is a rocking or tilting valve. The face members 53 and 54 have studs 55 for mounting in opposite openings 56 of a bar 57, and are removably fixed there by screws 58. Said bar 57 oscillates to swing one or another of the valve faces to a seat, by pivotal mounting of a valve stem or shaft 59 projecting from the bar perpendicularly to the valve faces, in the casing 27. Said pivotal mounting is accomplished by provision of a nut 60 screw-threadedly introduced into the housing and having the journal opening 61 to receive said shaft. The interior end of the nut is provided with a ground seat 62 to receive the ground seated collar 63 of the stem, and the frictional sealing of the bearing is established by a spring 64 mounted on the projecting end of the stem and anchored against the shoulder 65 of an arcuate lever 66 that is secured to the said stem end by screws 67. Vertical actuation of the outer end 68 of the lever causes rotation of the stem to oscillate the bar 57 and tilt one or another of the valve faces to its seat.

The lever 66 is actuated by electrical means represented by an electro-magnet 69 supported on the casing by means of a post 70. Wires 71 and 72 lead from the magnet to source of energy, which may be associated with a machine or a part of machine so that said magnet may be energized automatically to actuate the pilot valve synchronously with selected steps in the operation or behavior of other elements.

The magnet, of ordinary construction, comprises the solenoids 73 and 74, the cores 75 and 76 and the armature 77. One end 78 of the armature, having the opening 79, is loosely supported adjacent a core, for example 73, by the head and shank of a screw 80 projected through said opening 79 and into the core. The other end 81 of the armature is permitted by the loose mounting mentioned to sag in relatively greater spaced relation to the second core 76. This second core may also be provided with a screw, for sustaining the end 81 of the armature; but it preferably holds, in a bore 82, a pin 83 slidable in a collar 84 fixed in the bore, the collar providing a shoulder to receive the head of the pin and retain the pin as it may be urged to project, to thrust the armature from the core upon de-energizing of the magnet by the spring 85.

The outer end or free end 81 of the armature is connected with the lever 66 that actuates the valve, the connecting means being the rigid straight arm 86 and the bent spring arm 87, both secured to the armature by the screws 88, and having aligned openings 89 and 90 in their outer free ends 91 and 92; and the link 93 pivotally engaged with the lever at 94 and projecting through the openings of the arms 86 and 87. The free ends of said arms are limited in sliding movement over the link, that is to say, the link is engageable and actuatable by the vertically moving ends of the arms, by reason of the nuts 95 and 96 threaded on the link on opposite sides of the arms. Said nuts are means of adjusting the movements of the valve and the relations of the spring arm and rigid arm.

The bent free end 92 of the spring arm is by said bending spaced from the free end 91 of the rigid arm. The spring arm, therefore, meets the initial resistance of the lever upon the rising of the armature, due to energizing of the magnet, and, indeed, the spring arm may, by suitable adjustment, be enabled to actuate the lever for completely seating the valve 24. I provide also a set screw 97 threadedly engaged in the rigid arm and projecting against the spring arm for adjusting the spacing of the spring arm from said rigid arm and for adjusting the elevation of the lever end of the spring arm with reference to the contact plane of the core 76 and the armature.

The structure described provides for a relatively low resistance to the initial portion of the response of the armature to the energized magnet, and the exercising of the greatest pulling power of the magnet on the lever at the incident of displacing a valve face member from one seat and engaging the opposite valve face member securely on the other seat.

The spring arm rising with the drawn armature, engages the link yieldingly to pull on the lever, and the initial movement of the armature may or may not result in tipping the lever or, taking up all loose motion of connections, rocking the valve. As the armature approaches the magnet more closely, however, and a greater degree of force is conferred on the armature, the resistance of the bent end of the spring arm increases, tending to actuate the lever; and the rigid arm becomes engaged with the nut on the link to transmit the full power of the armature to the lever and valve.

The maximum force of the magnet is therefore exerted at the moment of maximum requirement, namely, to rock the valve for seating, and to press the valve on its seat.

When the valve 14 is to be closed, the magnet is de-energized, whereby the valve is permitted to resume its original position, the propulsion of the pin 83 against the armature and the pressing of the outer end of the depressed rigid arm against the lower limiting nut on the link 50, contributing to such result.

When the secondary conduit and pilot valve assembly only are employed for conducting and controlling a stream of gas or liquid for use, the cushion chamber 26 is, of course, subject to relatively light demand. I show said cushion chamber 26 as a part of the structure employed for the functioning of the secondary conduit system in the control of the main line valve since the cushion chamber for such purposes is preferably at the higher point at which the fluid under pressure rises in the members conducting fluid into the combined system and communicating with said conduits.

While I have described my invention as applied to a pressure valve system, it is obvious that it may be used also in a suction valve system, and for pumping purposes. A pipe or other bellows may be employed in place of the bellows shown in the application of the invention and within its broader claims. These and other minor changes and adaptations may be suggested by mechanical skill and employed without departing from the spirit of the invention.

What I claim and desire to secure by Letters Patent is:

1. A valve-operating device comprising a magnet, an armature actuatable by the magnet, a valve-actuating lever, an elastic member fixed to the armature and engaging the lever, and a second arm fixed to the armature and adapted to engage the lever after partial actuation of the lever through the elastic member.

2. In combination with a valve, a valve-operating device comprising a magnet, an armature, a valve-controlling lever actuatable by the armature, resilient means connecting the lever with the armature, and an arm fixed to the armature and engaged with the lever, said arm being adapted to reinforce the actuation of the lever by said resilient means.

3. The combination with a valve and a lever tending to close the valve, of means for opening the valve comprising a second lever provided with a projecting spring arm, said spring arm being engaged with the first named lever, and means supporting said valve opening means.

4. A valve-operating device comprising a magnet, an armature actuatable by the magnet, a valve-actuating lever, means for actuating the lever fixed to the armature and engaging the lever comprising a spring arm and a rigid arm having aligned openings to receive the lever, and a nut on the lever limiting movement of said arms through said openings, whereby functional movement of the armature causes the spring arm to advance the lever approximately to seating position and causes the rigid arm to enforce the valve on its seat.

5. A valve-operating device comprising a housing, a magnet mounted on the housing, an armature pivotally supported by the magnet, a valve-actuating lever comprising a spindle pivotally mounted in the housing and connected with the valve, and a crank for rotating the spindle, and a resilient member fixed to the armature and connected to the lever crank for actuating the lever in response to functional movement of the armature.

6. In an electrically operated valve, a housing, a nozzle projecting within the housing and having a valve seat, a valve pivotally mounted to engage the valve seat, a lever assembly comprising a spindle journaled in the housing and connected to the valve to rock the valve to said seat, a crank fixed to the spindle to rotate the same, and a link pivoted on the crank, a magnet mounted on the housing, an armature in functional relation with the magnet, and means connecting the armature with said link for actuation thereof in response to functional movement of the armature.

7. In combination with a pipe line, a source of fluid under pressure and a valve assembly in the pipe line comprising a partition having a port and a valve seat, and a valve for closing the port, a valve stem on the valve and reciprocable through the port, a tubular chamber extending from the pipe line and aligned with said port, a weight depending from the valve and received in said chamber, a secondary conduit communicating with the pipe line, and means in the secondary conduit actuatable by the pressure of the fluid for reciprocating the valve stem to actuate the valve.

8. In combination with a pipe line, a source of fluid under pressure and a valve assembly in the pipe line normally closed under the pressure of the fluid, said valve assembly including a valve stem reciprocally projecting through the port of the valve assembly, a secondary conduit communicating with the pipe line, means actuated by the fluid in the secondary conduit for actuating the valve, said means including a pressure expansible chamber connected with the valve stem, said pressure expansible chamber comprising a bellows having cross section greater than the cross section of said secondary conduit and receiving fluid for longitudinal extension thereof from the secondary conduit, and means controlling admission of fluid from the secondary conduit to said valve-actuating means.

In testimony whereof I affix my signature.

HENRY A. HOESCHEN.